United States Patent [19]
Todt

[11] Patent Number: 5,712,008
[45] Date of Patent: Jan. 27, 1998

[54] WRAP MATERIAL WITH WOVEN FABRIC

[75] Inventor: Gregory L. Todt, Union, Mich.

[73] Assignee: Transhield Technology Co., L.L.C., Elkhart, Ind.

[21] Appl. No.: 599,783

[22] Filed: Feb. 12, 1996

[51] Int. Cl.$^6$ .............................. B65B 53/00; B32B 3/26
[52] U.S. Cl. .................... 428/349; 428/198; 428/311.11; 428/311.51; 156/290; 156/291; 442/290
[58] Field of Search ................... 428/34.9, 198, 428/311.11, 311.51; 156/290, 291; 442/290

[56] References Cited

U.S. PATENT DOCUMENTS

| | | | |
|---|---|---|---|
| 4,720,415 | 1/1988 | Vander Wielen et al. | 428/152 |
| 5,491,017 | 2/1996 | Todt | 428/198 |

*Primary Examiner*—Helen Lee
*Attorney, Agent, or Firm*—Baker & Daniels

[57] ABSTRACT

A method and material for shrink wrapping articles includes wrapping the article with a shrink wrapping material having a shrink/stretch film outer layer and an inner layer of a woven fabric. The shrink/stretch film responds to heat by shrinking around the article being wrapped, while the woven fabric, which does not shrink or shrinks very little, forms pockets which bunch and gather up as shrinking takes place, thereby forming a cushion between the film and the object being wrapped. The woven fabric acts as a reenforcement for the film, both before and after shrinking, thus protecting the article wrapped from a hurled object and other similar hazards, and also protecting the article from direct engagement from the shrink/stretch film, which is relatively abrasive.

6 Claims, 2 Drawing Sheets

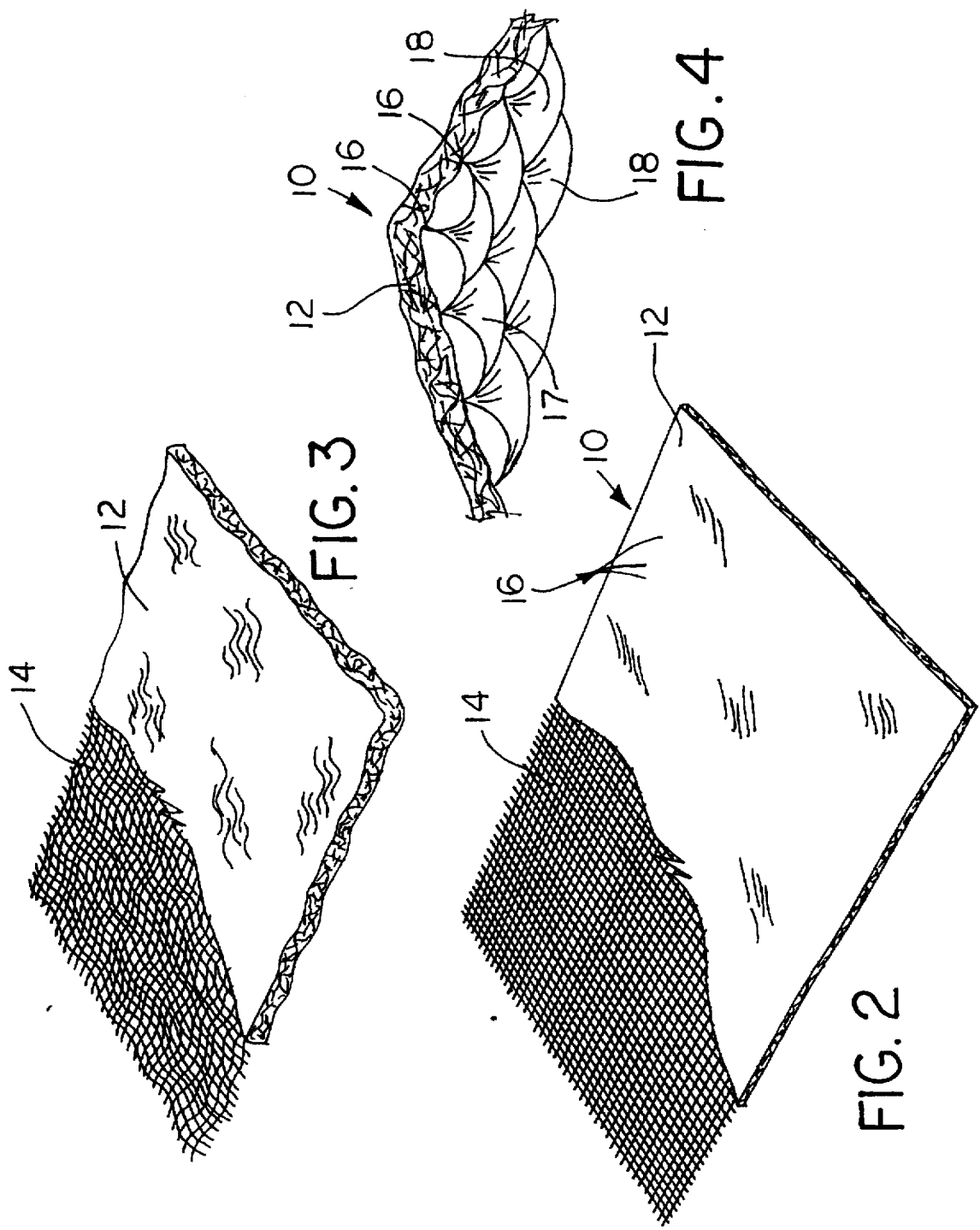

5,712,008

1

WRAP MATERIAL WITH WOVEN FABRIC

This invention relates to a shrink wrap material and a method for protecting articles by wrapping them in the shrink wrap material.

Large articles, such as automobiles, vans, machinery and boats often must be transported from the factory to the customer on open trucks where they are exposed to the elements. Customers expect that new vehicles, machinery, and other large articles to be in pristine condition when they are delivered, and will not tolerate flaws, even if such flaws are no fault of the manufacturer and have occurred after the article has been shipped from the factory. Damage may be caused by any number of factors. For example, acid rain is an increasingly common phenomena, and, if the acid rain is of sufficient concentration, damaged paint may occur. Furthermore, open transport of such articles subjects the articles to damage due to small rocks and stones which may be hurled against the article during transportation. One way to protect even large articles from the environment is through shrink wrapping, which is most commonly employed on very small household articles.

However, it is difficult to shrink wrap large articles, such as vehicles, machinery or boats. When the shrink wrap film is heated during shrinking, it becomes very vulnerable. Accordingly, holes are often pulled in the shrink wrap film as the latter is applied over the vehicle or other large object. Furthermore, the shrink wrap film itself is abrasive and can damage paint when the shrink wrap film is applied to an article.

According to the present invention, a two layer shrink wrap material includes a shrink/stretch film as the outer layer and a inner layer composed of a woven fabric. The outer layer may be any conventional shrink/stretch film, such as a polyolefin in the ethylene vinyl acetate copolymer family. The fibers of the woven layer may be, for example, polyester or cotton fibers. It is necessary only that the inner woven layer have a melt point and melting point significantly greater than the melting point and melt point of the outer shrink/stretch layer. It is also necessary that the outer shrink/stretch film has a significantly greater shrink response in response to heat applied to material than does the woven layer. During shrinking, film shrinks around the object being protected, forming a tight package. Since the inner woven layer either does not shrink or shrinks very little, the woven material bunches up and forms pockets as will hereinafter be described to form a soft cushion against the surface being protected.

During the heat shrink processes, the majority of the heat is absorbed by the film and a great deal of the remainder of the heat is reflected away from the object being protected by the fibers of the woven fabric, causing the heated film to shrink even faster due to reflected heat. At the same time, this reflection of heat shields the surface being protected from the heat. Thus, a cushion is formed by the bunching up of the woven layer which supports the film away from the surface of the object being protected. Since only the outer layer of the material crystallizes during the heating and shrinking process, and the woven inner layer remains in the same physical state, the problems associated with conventional shrink wrapping films and shrink wrapping processes, in which the films actually melt against the surface being protected, causing finish damage as well as heat damage, are eliminated.

The woven inner layer acts as a reenforcement for the shrink/stretch film outer layer both before and after shrinking. Before shrinking, the woven fabric acts as a typical

2 reenforcement. After shrinking, the outer layer crystallizes, thus improving the strength of the film, and the fabric, although it bunches up, continues to act as a reenforcement of the outer layer. Accordingly, the material according to the present invention has higher puncture resistance and tear resistance than other similar wrapping materials.

These and other advantages of the present invention will become apparent from the following description, with reference to the accompanying drawings, in which:

FIG. 2 is a view in perspective, with a portion of the outer film cut away, of the fabric according to the present invention before the material is shrunk;

FIG. 3 is a view similar to FIG. 3 but illustrating material after the material is shrunk; and FIG. 4 is a view in perspective taken through the side of the material opposite the side from which FIGS. 2 and 3 are taken, illustrating the pockets formed by the inner layer after shrinking has occurred.

Figure 1:
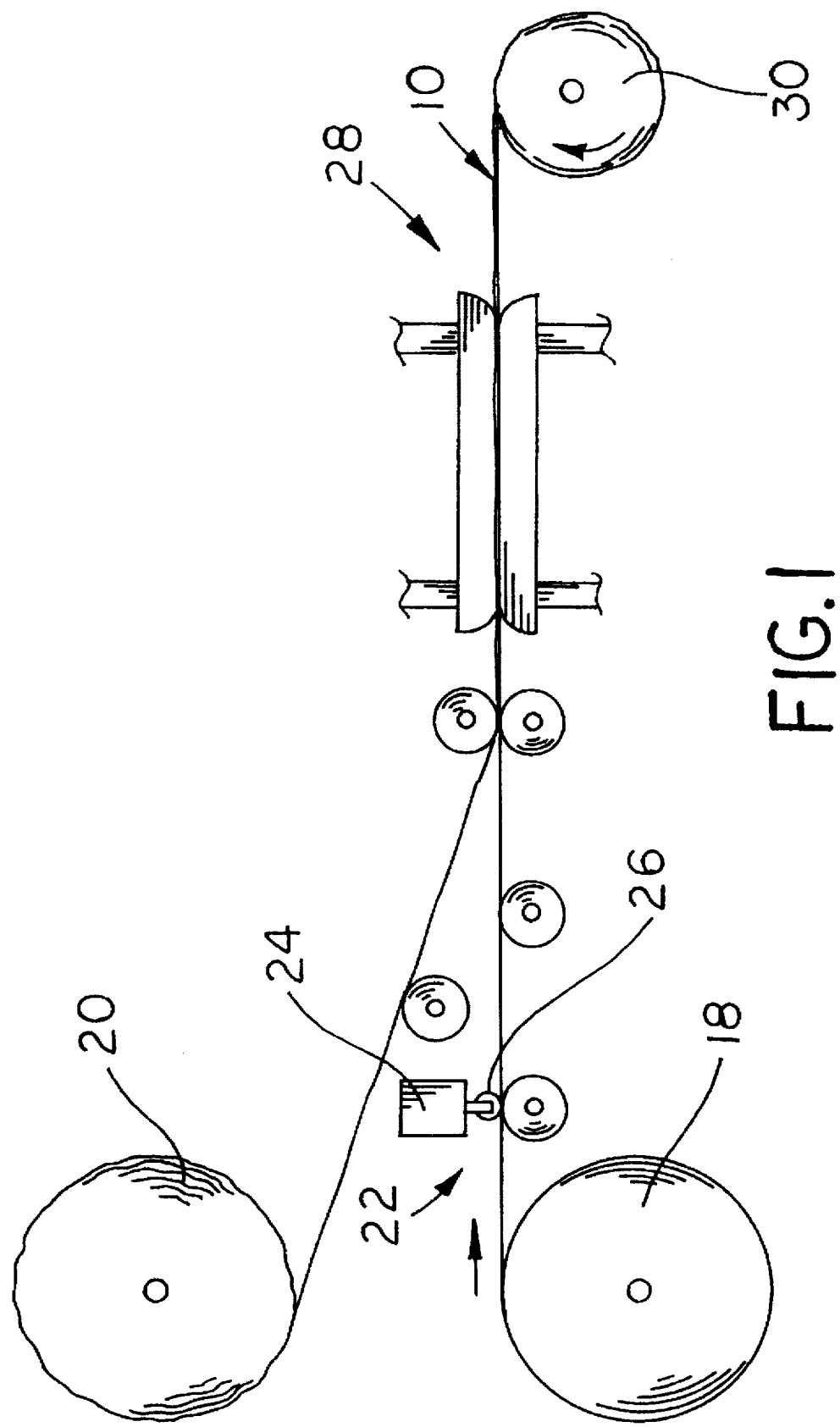
FIG. 1 is a schematic illustration of the manner in which the shrink wrapping material according to the present invention is manufactured.

Referring now to FIGS. 2–4 of the drawing, the fabric 10 according to the present invention consists of a outer layer 12 of a shrink/stretch film and a woven fabric inner layer generally indicated by the numeral 14. As discussed above, the film outer layer 12 may be any conventional shrink/ stretch film but is preferably a polyolefin in the ethylene vinyl acetate copolymer family. The inner layer may be woven of any well-known fiber, such as polyester or cotton. It is necessary only that the fibers of the inner layer 14 have a significantly higher melt point and melting point than does the outer film layer 12. Accordingly, during the shrinking process, heat applied to the outer shrink film 12 causes the film to crystallize and thus change state to shrink to about 85% of its initial dimensions. Since the inner layer 14 does not change state, the inner layer 14 does not shrink, or shrinks very little. The film layer 12 is bonded to the inner woven layer 14 at intermittent points generally indicated by the numeral 16. As will hereinafter be explained, an adhesive is applied on the film at the intermittent points 16 and then the film layer 12 and the woven fabric layer 14 are then brought together, causing the adhesive to adhere the film layer 12 to the woven fabric layer 14. The fabric 10 is placed around the object to be protected, with the woven layer 14 engaging the surface to be protected and the film 12 being the outer layer. Heat is then applied to the film to shrink the film in any conventional manner. As discussed in my prior U.S. patent application Ser. No. 08/324,105, filed Oct. 14, 1994, the material 10 is particularly suitable for wrapping large articles, such as automobiles, vans, motorcycles, lawn and garden equipment, military products, etc. The reenforcement provided by the inner layer 14 makes wrapping such large articles possible, because it is quite difficult to stretch the film alone over the vehicle or other large object during shrinking, since the film is vulnerable to damage and rupture during the shrinking process.

Since the outer layer 12 shrinks and the inner layer 14 does not shrink or shrinks very little and since the inner layer 14 is only intermittently bonded at points 16, the inner layer forms pockets such as the pockets 18 illustrated in FIG. 4 during shrinking of the outer layer. These pockets engage the article being protected, and gathers and bunches up as shown in FIG. 4, thus providing a soft cushion against the article being protected and supporting the film layer 12 away from the article being protected, since the film layer 12 is abrasive and may damage the article being protected if the film contacts the article directly. It is also known, as set forth in my U.S. patent application Ser. No. 08/525,275, filed Sep. 8, 1995, to add an additive to the adhesive securing the inner layer 14 to the outer layer 12. This additive may be a vapor releasing additive, such as a vapor corrosion inhibitor, that creates a protective atmosphere around the article wrapped by the material 10. The woven material 14 is permeable to the vapor, but the film layer 12 is not; accordingly, the additive is prevented from escaping from the enclosure formed by the material 10 around the object being protected.

Referring now to FIG. 1, the material 10 is manufactured by feeding the film 12 from a roll 18 and the woven fabric 14 from a roll 20. The film 12 is fed through a gluing station 22 where a hot melt adhesive is stored in a container 24 and applied to the film 12 by a graver or similar contoured roller 26. The roller 26 is well known and skilled in the art, and the contours on the roller apply glue at only intermittent points on the film 18 as it passes through the gluing stations 22. The adhesive may be any suitable adhesive, preferably a hot melt adhesive of the block copolymer family. The film 18 and fabric 20 are then fed to a bonding station 28 after the adhesive has been applied to the film 18. The bonding station 28 adjusted that the film is brought into engagement with the fabric 20. Since the hot melt adhesive is very tacky, it is only necessary to lightly touch the fabric and film together in order to achieve bonding. The finished material 10 is then rolled up on a take-up roll 30.

I claim:

1. Material for shrink wrapping articles comprising a shrinkable, stretchable film first layer having a predetermined shrink response in response to heat applied to the film and a woven fabric second layer engaging said first layer, said second layer being secured to said first layer by intermittent bonds distributed across the engaging surfaces of the film, said first layer shrinking at a greater rate than said second layer whereby said second layer bunches up to form pockets providing a cushion between said first layer and the article being wrapped.

2. Material for shrink wrapping articles as claimed in claim 1, wherein said first layer is secured to said second layer by an adhesive.

3. Material for shrink wrapping articles as claimed in claim 2, wherein said adhesive secures said first layer to said second layer at discrete points, said layers being unbonded between said discrete points.

4. Material for shrink wrapping articles comprising a shrinkable stretchable film first layer having a predetermined shrink response in response to heat applied to the film and a woven fabric second layer engaging said first layer, said first layer having a shrink response such that the first layer shrinks at a greater rate than said second layer whereby said second layer bunches up to form pockets providing a cushion between said first layer and the article being wrapped.

5. Material for shrink wrapping articles as claimed in claim 4, wherein said first layer is secured to said second layer by an adhesive.

6. Material for shrink wrapping articles as claimed in claim 5, wherein said adhesive secures said firs( layer to said second layer at discrete points, said layers being unbonded between said discrete points.

* * * * *